Oct. 18, 1966 — J. WORTHINGTON — 3,279,648
ARTICLE CARRIER
Filed Sept. 30, 1964

INVENTOR.
JACK WORTHINGTON
BY Young & Quigg
ATTORNEYS

United States Patent Office 3,279,648
Patented Oct. 18, 1966

3,279,648
ARTICLE CARRIER
Jack Worthington, Bartlesville, Okla., assignor to Phillips Petroleum Company, a corporation of Delaware
Filed Sept. 30, 1964, Ser. No. 400,524
2 Claims. (Cl. 220—116)

This invention relates to an article carrier and a method of fabricating and assembling same.

Article carriers are known which are formed of cardboard or similar material. It is also known that such carriers do not enjoy a long life of utility or attractiveness and tend to absorb moisture thereby shortening an already limited term of longevity. Heretofore it has been very difficult to form similar article carriers from plastic since the final configuration of such carriers is not readily attained by known plastic forming operations such as blow molding and the like.

Other carriers, both plastic and cardboard, are known which, once formed into a carrier configuration, must remain in that configuration and, thus, when being transported or stored in an unused condition, consume a volume in excess of that which would be necessary were it not for the fact that said carrier is fixed in said ultimate carrying configuration.

According to this invention, there is provided a collapsible article carrier composed of a single, continuous, substantially planar sheet of plastic material. In the collapsed or unfolded configuration the sheet of material has in a central portion thereof a flat base which can have depressions capable of receiving the bottom of an article and holding same. At either end of the sheet there are provided apertures which, when the sheet is folded into a carrying configuration by bringing the ends into abutment, coincide and serve as a handle. Intermediate of each handle aperture and the base there are provided additional apertures of a shape which, in the folded configuration, allows an article to pass therethrough and thereafter positively hold the upper portion of the article. This prevents contacting of articles while being transported in the carrier. Drain holes can be provided in the base or depressions so that moisture can be removed.

Further, there is provided releasable locking means which holds the carrier in the folded configuration and which can be disengaged to unfold the carrier into an open configuration for nesting.

Accordingly, it is an object of this invention to provide a new and improved article carrier. It is another object of this invention to provide a flexible and adaptable carrier capable of being disassembled and stacked in a nesting relationship. It is another object of this invention to provide a new and improved method of forming and assembling the carrier of this invention.

Other aspects, objects and the several advantages of this invention are apparent from a study of this disclosure, the drawings and the appended claims.

Figure 1:
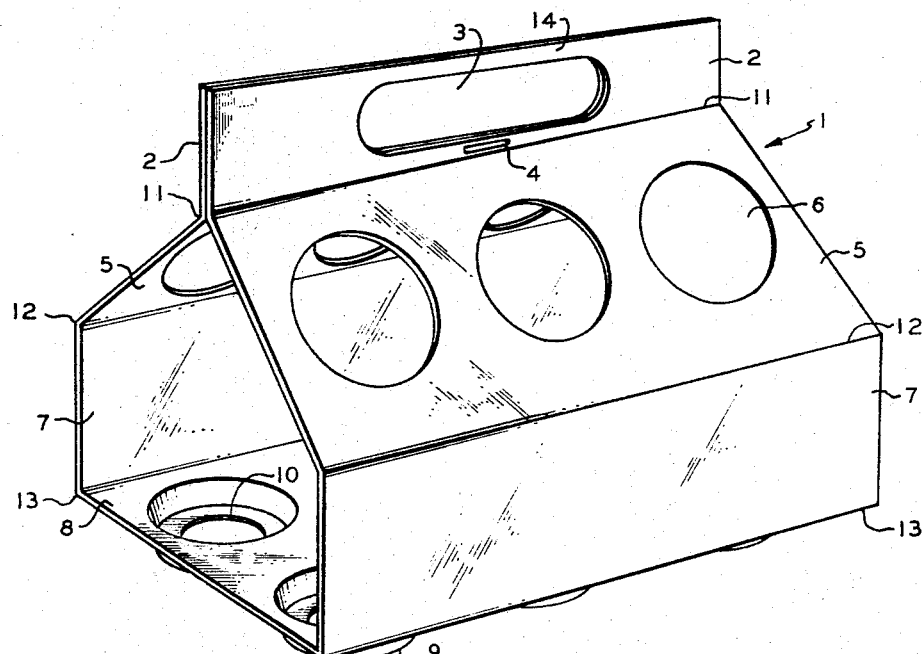
FIGURE 1 is a perspective view of the article carrier.

More specifically, there is shown in FIGURE 1 a carrier 1, made of a single sheet of plastic and having an upper handle portion of upstanding panels 2, 2, and having therein a handle aperture 3. Sides 2, 2 are held together by a locking tab 4. Upstanding and converging sides 5, 5 contain apertures 6, through which an article to be transported is passed. Upstanding sides 7, 7 provide vertical space for the accommodation of the article to be transported. Base 8 has therein depressions 9, each having at least one drain hole 10.

Depressions 9 can be of any configuration, as can apertures 6. The configuration of the depressions and apertures will depend upon the article to be transported. The depressions should be wide enough and deep enough to loosely receive and positively hold the article bottom, thereby preventing the article being transported from contacting another article and damaging each other. Generally, a depth from one-quarter inch to one and one-half inch will be sufficient to keep the articles from colliding with one another. Said depressions are desirably of a configuration which encourages the maximum amount of nesting in the open configuration. For example, said depressions can have tapered walls, so that when two carriers in open configuration are placed on top of another, depression 9 of the upper carrier will move a maximum distance into depression 9 of the lower carrier, thereby providing the ultimate in economy for shipping and storing.

Drain hole 10 can be of any desired configuration. However, the drain holes should be smaller than the top of the articles to be carried, so that the top of one article will not engage the bottom of another one when two or more carriers are stacked. Sides 2, 2 are integral with sides 5, 5 by fold lines 11, 11 which are merely a deformed part of the single plastic sheet of material from which the whole carrier is fabricated. Similar fold lines 12, 12 join sides 5, 5 and sides 7, 7. Also, similar fold lines 13, 13 join base 8 with sides 7, 7.

The carrier is adapted to be folded and unfolded repeatedly and hence can be reinforced at one or more of the fold lines mentioned. Suitable reinforcement can be achieved by increasing the thickness of the sheet at said fold lines or by applying thicker strips of material at various points along the fold line thereby providing a hinge type of reinforcement. Any type of reinforcement is suitable to the invention and will be obvious to one skilled in the art. It should be noted that in order to prevent inward collapsing of sides 5, 5 and 7, 7 fold lines 13, 13 should be less rigid than the other fold lines. This can be achieved by reinforcing the other fold lines, especially 12, 12, and not fold lines 13, 13.

The cut-out material formed by the creation of aperture 3 in panels 2, 2 can be utilized to form a thicker gripping area 14.

Although it has been disclosed that locking tab 4 temporarily maintains sides 2, 2 in abutting relationship and can, therefore, be disengaged to form said open configuration, it is within the scope of this invention to staple, heat seal, or otherwise join sides 2, 2 permanently. Also, any suitable type of locking means and any number thereof can be utilized in lieu of the locking tab 4, which consists of an extended portion of one side 2 which registers with, and is forced through, a corresponding slot in the other side 2.

Figure 2:
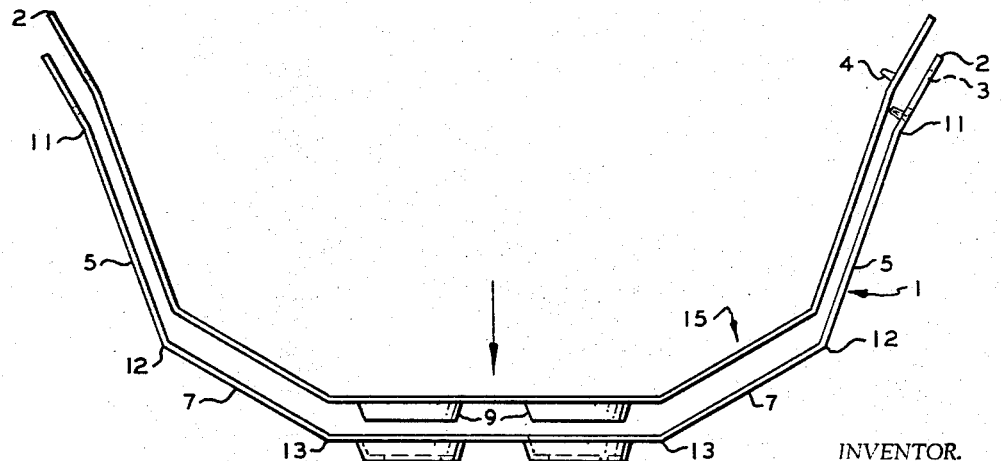
FIGURE 2 is an end view of the sheet from which the carrier is formed by folding, two carriers being shown in juxtaposed position.

In FIGURE 2 there is shown the open configuration and the nesting feature, both above discussed. It can be seen from this figure that when sides 2, 2 are disengaged said carrier opens into a configuration which is adapted to receive a downward moving carrier 15. As discussed above, depressions 9 of carrier 15 are desirably of a configuration which will penetrate into depressions 9 of carrier 1. In this manner the nesting of carriers in the open configuration will consume the least possible volume for storage, shipment or other disposition.

The articles of this invention can be formed from any moldable or otherwise formable plastic such as polyethylene or polypropylene. The plastic material is preferably thermoplastic and, therefore, moldable under heat and pressure so that the resulting article is moisture resistant, can be repeatedly washed and still remain durable and attractive. The articles of this invention are readily decorated by various known methods such as distortion printing, silk screen processes, etc.

The articles of this invention can be formed by known high-speed thermoforming methods. Vacuum forming, mechanical forming, a combination of mechanical and vacuum forming, injection molding, vacuum molding and pressure molding operations in which a sheet of pliable plastic material is shaped by the use of differential pressures applied to opposite sides thereof are applicable. The forming method can either form the depressions and apertures simultaneously or subsequently and can either leave the sheet substantially flat or bend same along certain desired fold lines so that, upon removal, the sheet is no longer flat, but rather, is partially deformed along lines situated on the sheet in a manner such that upon bringing two outer edges of the sheet together there is produced an article of the desired carrying configuration.

The size of the carrier depends upon the use to which it is ultimately to be put and to the requirement of industry. The carrier can be made of a size and configuration suitable for use in automatic uncasing machines presently known. The thickness of the sheet used to form said carrier can be anything required to perform the task to which the carrier is subjected. Generally, the thickness will be in the range of 10 to 60 mils but is not critical and will vary.

Reasonable variations and modifications of this invention can be made, or followed in view of the foregoing, without departing from the spirit or scope thereof.

I claim:
1. A one-piece, foldable, plastic article carrier formed from a relatively thin single plastic sheet of substantially uniform thickness, comprising a base defined by parallel fold lines and having at least one article receiving depression therein of a configuration adapted to accept in the interior thereof in nesting fashion a separate like formed depression of another carrier, two upstanding sides integral with opposite ends of said base, two upstanding and converging sides each integral with one of said upstanding sides, means for temporarily locking said upstanding and converging sides together, said upstanding and converging sides having therein at least one aperture in registration with at least one of said depressions, two upstanding sides integral with said upstanding and converging sides, each upstanding side having nonflanged hand apertures in registration with one another, said carrier being capable of being unlocked, opened up and having another opened carrier nested therein so that the two carriers in nesting position take up no more vertical height than the thickness of the sides of each carrier.

2. An article comprising a relatively thin, single sheet of plastic material of substantially uniform thickness, said sheet having in a central section thereof a base defined by substantially parallel fold lines, said base having at least one article receiving depression therein of a configuration adapted to accept in the interior thereof in nesting fashion a separate like formed depression of another article, a pair of sides each integral with opposite ends of said base along said fold lines and upwardly and outwardly depending from said base, said sides having a configuration such that upon movement thereof in an inward direction toward one another there is formed when the upper portion of said sides resides in a vertical plane passing through said bottom section a carrier of carrying configuration, said sides further having apertures therein oriented so that when said sides are moved inwardly into said abutting relation each of said apertures is aligned with at least one of said depressions, upstanding sides having nonflanged apertures therein that register with one another when moved inwardly into said abutting relationship and thereby form a handle means, lock means for temporarily locking said upstanding sides to one another, said article thereby being capable of having another similar article nested therein so that the two articles in nesting position take up no more vertical height than the thickness of the sides of each article.

References Cited by the Examiner
UNITED STATES PATENTS

| | | | |
|---|---|---|---|
| 966,258 | 8/1910 | Sochurek. | |
| 2,532,725 | 12/1950 | Laier | 220—109 |
| 2,568,436 | 9/1951 | Faria | 220—105 |
| 2,804,234 | 8/1957 | Lachance | 220—116 |
| 3,025,998 | 3/1962 | Petersen | 220—102 |
| 3,039,651 | 6/1962 | Lang | 220—110 |

GEORGE O. RALSTON, *Primary Examiner.*